2,968,629
Patented Jan. 17, 1961

2,968,629
METHOD OF INHIBITING CORROSION

Ralph B. Thompson, Hinsdale, Ill., assignor, by mesne assignments, to Universal Oil Products Company, Des Plaines, Ill., a corporation of Delaware No Drawing. Filed Sept. 29, 1958, Ser. No. 763,846

10 Claims. (Cl. 252—389)

This is a continuation-in-part of my copending application Serial No. 677,805, filed August 12, 1957, now abandoned, and relates to a novel method for inhibiting corrosion of metal surfaces by water associated in relatively small quantities with organic materials.

In the handling of various organic materials, particularly hydrocarbons and similar organic liquid compositions, it is often necessary to transport and/or store such materials in metal containers, as in steel, iron or other metal pipe lines, drums, tanks and the like. Since these materials often contain varying amounts of water in solution or in suspension which may separate, due to temperature changes, internal corrosion of the container by separating water almost invariably occurs to a greater or lesser degree. This problem is especially serious when handling gasoline, kerosene, fuel oil, crude oil, etc. In spite of all reasonable and practical precautions during the manufacture of the hydrocarbon distillate, water is found as a film or in minute droplets in the pipe line or in container walls or even in small pools in the bottom of the container. This brings about ideal conditions for corrosion and consequent damage to the metal surfaces of the container, as well as the even more serious contamination of the hydrocarbon oil or other materials contained therein by the corrosion products.

Corrosion problems also occur, for example, in the lubrication of internal combustion engines or steam engines including turbines and other similar machinery, in which quantities of water are often observed as a separate phase within the lubricating system as a result of the condensation of water from the atmosphere or, in the case of internal combustion engines, as a result of dispersion or absorption in lubricating oil of water formed as a product of fuel combustion. Water in such instances, corrodes the various metal parts of the machinery with which it comes in contact, the corrosion products causing further mechanical damage to bearing surfaces and the like due to their abrasive nature and catalytically promoting the chemical degradation of the lubricant. Corrosion problems are encountered with other oils including cutting oils, soluble oils, rolling oils, the latter comprising oils used in the rolling of metals, which oils also may be used in other forming operations such as stamping, cutting, casting, etc., of metals, etc. These oils may be of mineral, animal or vegetable origin. Corrosion problems also arise in the preparation, transportation and use of alcohols, ketones, etc., and in various coating compositions such as greases, both of synthetic and petroleum origin, waxes, household oils, paints, lacquers, etc., which often are supplied to metal surfaces for protective purposes.

A particular application of the corrosion inhibitor of the present invention is in greases used for special applications. For example corrosion problems are serious in cases of greases used in instruments, aircrafts, watches, etc. It is apparent that, in these delicate and important applications, it is essential to prevent corrosion. The greases may be of animal, vegetable or mineral origin or may be synthetically prepared.

It is an object of this invention to provide potent corrosion inhibitors which are soluble in organic materials. A further object is to provide inhibitors of this type which will satisfactorily prevent corrosion of certain metal surfaces by water in contact with said organic materials and said metal surfaces. Further objects are to provide corrosion inhibitors which are stable at ordinary temperatures of use, easily and inexpensively prepared, and which will not deleteriously affect organic materials with which they are incorporated. Other objects, together with some of the advantages to be derived when utilizing the inhibitors of the present invention, will become apparent from the following detailed description thereof.

In one embodiment the present invention relates to the method of retarding corrosion of metal surfaces upon contact with an organic substance and water, which comprises effecting said contact in the presence of a corrosion inhibitor comprising the condensation product of a beta-lactone and an amine.

In a specific embodiment the present invention relates to a method of retarding corrosion of a metal surface upon contact with a hydrocarbon distillate and water which comprises incorporating in said hydrocarbon distillate a corrosion inhibitor comprising the condensation product of beta-propiolactone and N-tallow-1,3-diaminopropane, whereby said contact is effected in the presence of the corrosion inhibitor.

In another embodiment the present invention relates to an organic material coming in contact with water, said organic material containing a corrosion inhibitor herein set forth.

The novel corrosion inhibitor of the present invention is prepared by the condensation of a beta-lactone with an amine. Any suitable beta-lactone may be used in preparing the inhibitor of the present invention. Beta-propiolactone generally is preferred because of its ready availability and lower cost. However, other beta-lactones may be utilized in the preparation of the corrosion inhibitor of the present invention. Illustrative saturated aliphatic beta-lactones include beta-butyrolactone, beta-valerolactone, beta-isovalerolactone, alpha-methyl-beta-propiolactone, alpha-ethyl-beta-propiolactone, beta-isopropyl beta-propiolactone, beta-methyl-beta-valerolactone, etc. While it is preferred to utilize the saturated aliphatic beta-lactones and more particularly these lactones containing a total of 3 to 6 carbon atoms, in some cases, unsaturated lactones or lactones containing a cyclic configuration may be employed as, for example, the lactone of o-(hydroxymethyl)-phenyl-acetic acid. In some cases a mixture of beta-lactones may be employed. It is understood that the various lactones which may be utilized are not necessarily equivalent and that the particular beta-lactone to be used will be selected with regard to the availability, cost, amine used in the condensation, the specific substrate in which the condensation product is to be employed as a corrosion inhibitor, etc.

Any suitable amine may be used in the preparation of the condensation product. When the condensation product is to be incorporated in a hydrocarbon distillate heavier than gasoline, the amine preferably contains at least 8 carbon atoms and still more preferably at least 12 carbon atoms. Usually the amine will contain from 8 and preferably from about 12 to about 30 carbon atoms in one embodiment or up to about 70 carbon atoms in another embodiment. It is understood that the amine will be selected with regard to the particular beta-lactone to be used in the condensation so that the condensation product will contain at least 11 and preferably at least 15 carbon atoms. The amine may be a primary, secondary or tertiary amine. Illustrative primary amines include amyl amine, hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, etc. A number of amines are available commercially, generally as a mixture, and these amines advantageously may be used in preparing the condensation product of the present invention. Illustrative examples of such amines include cocoanut amine, soy bean amine, tallow amine, stearyl amine, etc., and generally contain from about 8 to about 18 carbon atoms per molecule, while other amines are available containing a higher number of carbon atoms per molecule.

It is understood that polyamines and particularly diamines or triamines containing two primary amino groups may be used in preparing the condensation product. The polyamines preferably contain at least 8 carbon atoms. Illustrative examples of such amines include octamethylene diamine, nonamethylene diamine, decamethylene diamine, undecamethylene diamine, dodecamethylene diamine, etc.

A particularly preferred amine containing a secondary amino group is N-tallow-1,3-diaminopropane. This substituted amine is available commercially under the trade name of "Duomeen T" or "Diam 26" and contains from about 12 to 20 carbon atoms per alkyl group and mostly 16 to 18 carbon atoms. Other substituted N-alkyl diaminopropanes comprise those in which the alkyl group is derived from lauric acid, coconut, soya, etc. Other secondary amines include dipropyl amine, dibutyl amine, diamyl amine, dihexyl amine, diheptyl amine, dioctyl amine, dinonyl amine, didecyl amine, diundecyl amine, didodecyl amine, etc.

A number of tertiary amines are available commercially and are advantageously used in preparing the condensation product. One such amine is stearyl dimethyl amine. Other tertiary amines include tripropyl amine, tributyl amine, triamyl amine, trihexyl amine, triheptyl amine, trioctyl amine, trinonyl amine, tridecyl amine, etc., as well as tertiary amines in which all of the tertiary alkyl groups are not the same chain lengths.

In another embodiment the amine used for condensation with the beta-lactone may be prepared by the condensation of an amine with another compound. For example, an effective inhibitor was obtained by first condensing Duomeen T with formaldehyde and then further condensing this condensation product with beta-propiolactone. In this embodiment the Duomeen T and formaldehyde preferably are condensed in equal molar proportions at a temperature of from ambient to about 100° C., although different proportions and temperatures may be used in some cases.

In another example, an effective inhibitor was obtained by condensing Duomeen T and ethylene diamine with epichlorohydrin and then condensing the product with beta-propiolactone. In this embodiment a total of 1 or 2 mols of the amine preferably are reacted with 1 mol of epichlorohydrin and generally at a temperature of from ambient to about 100° C. although, in some cases, different proportions and temperatures may be employed.

In still another example a satisfactory inhibitor was obtained by condensing tallow amine and tetraethylene pentamine with epichlorohydrin and then condensing the product with beta-propiolactone. In this embodiment a total of 1 or 2 mols of the amine preferably are reacted with 1 mol of epichlorohydrin and generally at a temperature of from ambient to about 100° C. although in some cases different proportions and temperatures may be employed.

In some cases the amine may be selected from aryl-substituted aliphatic amines as, for example, benzyl amine, phenyl ethyl amine, para xylene amine, etc., from aromatic amines as, for example, aniline, toluidine, xylidine, naphthylamine, etc., heterocyclic amines as, for example, pyridyl amines, quinolyl amines, etc., and amines containing oxygen as, for example, N-furfuryl amine, morpholine, beta-ethoxy ethyl amine, pentanol amine, hexanol amine, heptanol amine, octanol amine, etc., tris(hydroxymethyl)-aminomethane, polyethanol amines, etc. In still other cases, the amine may contain sulfur or halogen as, for example, in compounds as chloroamyl amine, chlorohexyl amine, chloroheptyl amine, chlorooctyl amine, etc., polychloro amines, aminoethyl sulfide, beta, beta'-diamino butyl sulfide, mercaptoamyl amine, mercaptohexyl amine, mercaptooctyl amine, etc., cistene, astine, taurine, etc.

As hereinbefore set forth, the specific amine utilized in the preparation of the condensation product will be selected with regard to availability, cost, specific beta-lactone with which it is to be condensed, specific substrate in which the condensation product is to be used, etc. It is understood that the condensation products formed from the different amines are not necessarily equivalent in the same or different substrates. In most cases, the condensation product will comprise a mixture of different compounds and probably a mixture of different classes of compounds, depending upon the particular beta-lactone and the particular amine employed. It is believed that these reaction products include beta-N-substituted-amino carboxylic acids, probably existing as a zwitter-ion, N-substituted hydracrylamides, and mixtures thereof. As hereinbefore set forth, these condensation products are effective inhibitors and may be used as such without the added time and expense to separate specific compounds therefrom, although in some cases further treatment to concentrate desired compounds may be justified.

The condensation of the amine with the beta-lactone is effected in any suitable manner. In general, this condensation is readily effected by mixing the amine and beta-lactone. Generally an excess of amine is preferred in order to insure complete reaction with the beta-lactone and to avoid polymerization of the lactone. In a preferred method, the beta-lactone is added to a stirred solution of the amine. While the reaction may be effected at ambient temperature, an elevated temperature generally is preferred in order to accelerate the reaction. The temperature usually will be within the range of from about 50° to about 100° C., although a higher temperature may be employed when utilizing superatmospheric pressures to maintain the reactants in liquid phase. The reaction is readily effected in the absence of a solvent. However, when desired, a suitable solvent may be employed. The solvent must not react with the amine or beta-lactone. Inert solvents include hydrocarbons, esters, etc.

The condensation is effected using the beta-lactone in a concentration sufficient to react with from about 10% to about 100% of the nitrogen contained in the amine. For example, when a monoamine is used in the condensation, equal molar proportions of beta-lactone and amine will result in reaction of the beta-lactone with 100% of the nitrogen. However, when a diamine is used in the condensation, equal molar proportions of lactone and amine will result in the reaction of 50% of the nitrogen contained in the amine. When it is desired to react 100% of the nitrogen, 2 mols of lactone are used per mol of the diamine. Similarly, when a triamine is used for condensing with the lactone, equal molar proportions of lactone and amine will result in the reaction of one-third of the nitrogen. Accordingly, 3 mols of lactone per mol of triamine should be used to obtain 100% reaction of the nitrogen. Similarly, when the amine contains 6 nitrogens, it will be necessary to utilize 6 molar proportions of beta-lactone to obtain 100% reaction of the nitrogens. In any event, the lactone must be used in a concentration to obtain reaction of at least 10% of the nitrogen contained in the amine.

When the amine is condensed with beta-lactone in a concentration below that necessary to react with 100% of the nitrogen, in another embodiment of the invention, all or a portion of the unreacted nitrogen may be neutralized with an inorganic acid and particularly phosphoric acid and still more particularly alkyl esters of phosphoric acid. While the inorganic acid may comprise hydrogen halide, alkyl halide and particularly hydrogen chloride and alkyl chloride, sulfuric acid and particularly alkyl sulphates, etc., as hereinbefore set forth it is preferred that alkyl esters of phosphoric acid be utilized. The alkyl esters may be mono and/or dialkyl acid phosphates and particularly the orthophosphates in which at least one alkyl group contains from 5 to about 30 carbon atoms.

Particularly preferred phosphates include mixtures of mono- and diamyl acid orthophosphates, mono- and dioctyl acid orthophosphates, mono- and didecyl acid orthophosphates, mono- and didodecyl acid orthophosphates, as well as phosphates prepared from fatty alcohols in which one or both of the alkyl radicals are selected from capryl, lauryl, stearyl, myristyl, palmityl, ceryl, etc. In other examples the phosphate may comprise ethyl lauryl acid orthophosphate, ethyl stearyl acid orthophosphate, etc. It is understood that these are preferred phosphates and that other suitable alkyl esters of phosphoric acid may be employed.

The reaction product generally is recovered as a viscous liquid and may be marketed or used as such or utilized as a solution in a solvent. Conveniently, the solvent will comprise the same solvent, when employed, used in preparing the condensation product and is recovered in admixture with at least a portion of the solvent, thereby avoiding the necessity of recovering all of the solvent and subsequently adding it back. When a more dilute solution is desired than is recovered in the manner hereinbefore set forth, it is understood that the same or different solvent may be commingled with the mixture to form a solution of the desired concentration.

The concentration of the condensation product to be used as corrosion inhibitor will depend upon the particular substrate in which it is to be used. The corrosion inhibitor will be used in a concentration of from about 0.0001% to about 10% by weight or more and usually will be used in a concentration of from about 0.001% to about 3% by weight of the substrate. The inhibitor may be used along with other additives which are incorporated in the substrate for specific purposes including, for example, antioxidant, metal deactivator, synergist, dye, fuel improver, etc.

The corrosion inhibitor may be incorporated in the substrate in any suitable manner. As hereinbefore set forth, the condensation product conveniently is marketed as a solution in a suitable solvent, including hydrocarbons and particularly aromatic hydrocarbons as, benzene, toluene, xylene, cumene, etc., or alcohols, ketones, etc. When the inhibitor is to be incorporated in a liquid substrate, it may be added thereto in the desired amount and the resultant mixture suitably agitated in order to obtain intimate admixing of the inhibitor in the substrate. When the inhibitor is to be incorporated in a normally solid substrate, the substrate may be heated to form a liquid composition and the inhibitor added thereto or the inhibitor may be incorporated in the solid substrate in any other suitable manner.

The following examples are introduced to illustrate further the novelty and utility of the present invention but not with the intention of unduly limiting the same.

*Example I*

The corrosion inhibitor used in this example was prepared by the condensation of Duomeen T and beta-propiolactone. As hereinbefore set forth, Doumeen T is N-tallow-1,3-diaminopropane. Equimolar proportions of Duomeen T and beta-propiolactone were used. The Duomeen T was heated to a temperature of 60° C. with stirring, and beta-propiolactone was gradually added thereto. The condensation product was recovered as a viscous liquid.

The condensation product prepared in the above manner was evaluated as a corrosion inhibitor in a humidity cabinet test. In this test, a high polished steel panel is dipped into a viscous naphthenic mineral oil, excess oil is drained, and the panel is placed in a humidity cabinet maintained at 120° F. in an atmosphere saturated with water. The panels are slowly rotated, and the time required for visible corrosion to appear on the panel is reported. A panel dipped in a control sample of the oil (not containing an inhibitor) undergoes visible corrosion in 2 to 3 hours.

1% by weight of the condensation product as described above was incorporated in another sample of the oil. The steel panel dipped in this oil and then placed in the humidity cabinet did not undergo visible corrosion until after 13 days of exposure at 120° F. to the atmosphere saturated with water. Thus, it will be seen that the condensation product of the present invention served to considerably inhibit corrosion.

*Example II*

The inhibitor of this example was prepared by the condensation of beta-propiolactone with a mixed commercial amine. The amine is marketed under the name of "Alamine 26-D" by General Mills, Inc. and contains 30% hexadecyl amine, 25% octadecyl amine and 45% octadecenyl amine. The condensation was effected using equimolar proportions of the amine and beta-propiolactone. The amine dissolved in isopropyl alcohol was heated to about 50° C. with stirring, and beta-propiolactone was gradually added thereto. After the reaction has been completed, the isopropyl alcohol was removed by distillation, and the condensation product recovered as a viscous liquid.

1% by weight of the condensation product prepared in the above manner was incorporated in a different oil and evaluated in the humidity cabinet. The steel panel dipped in the oil containing the condensation product did not undergo visible corrosion until after 24 days of exposure at 120° F. to the atmosphere saturated with water. In contrast, a steel panel dipped in another sample of the oil but not containing the inhibitor underwent visible corrosion in 2–3 hours. Here again, it will be seen that the inhibitor of the present invention served to considerably inhibit corrosion.

*Example III*

As hereinbefore set forth, effective inhibitors also are obtained by first condensing the amine with a different compound and then further condensing this product with a beta-lactone. In this preparation, one mol proportion of Duomeen T dissolved in 2-propanol solvent was heated with stirring to 60°–65° C. One mol of epichlorohydrin dissolved in 2-propanol was added gradually to the amine solution. After the reaction was completed, the entire solution was removed from the reaction zone and was added gradually to a refluxing solution of one mol of ethylene diamine. Subsequently, the solution was reacted with sodium hydroxide and filtered to remove sodium chloride. The resulting condensation product was heated to about 60° C. with stirring and one mol proportion of beta-propiolactone was added gradually to the first condensation product and the reaction allowed to proceed to completion. The solvent was removed by distillation and the final condensation product was recovered as a viscous liquid.

When evaluated in the humidity cabinet in another sample of the oil described in Example I, the steel panel dipped in this oil containing 1% by weight of the condensation product described above did not undergo visible corrosion until after 16 days of exposure at 120°

F. to the atmosphere saturated with water. It will be recalled that a steel panel dipped in a sample of this oil not containing inhibitor underwent visible corrosion in 2–3 hours.

Example IV

The corrosion inhibitor of this example was prepared by first condensing a hydrogenated distilled tallow amine (marketed under the trade name of "Armeen HTD") and tetraethylene pentamine with epichlorohydrin and then reacting the product with beta-propiolactone. These condensations were effected by the same general methods as described in Example III.

When the condensation product prepared in the above manner was evaluated in a concentration of 1% by weight in the same manner as described in Example I, visible corrosion did not appear until after 16 days of exposure in the humidity cabinet at 120° F. to the atmosphere saturated with water. Here again, it will be noted that the inhibitor of the present invention was very effective in inhibiting corrosion.

Example V

The corrosion inhibitor of this example was prepared by the condensation of tallow amine (Armeen HTD) with epichlorohydrin followed by the condensation of the product with beta-propiolactone in equimolar proportions. The first condensation was effected using equimolar proportions of tallow amine and epichlorohydrin and by adding the epichlorohydrin gradually to a heated (about 60° C.) and stirred solution of the amine in 2-propanol. After this reaction was completed, beta-propiolactone was gradually added in equimolar proportions to the heated (60° C.) and stirred mixture.

When evaluated in the humidity cabinet, the steel panel dipped in another sample of the oil described in Example I but containing 1% by weight of this inhibitor did not undergo visible corrosion until after 19 days of exposure in the humidity cabinet. Here again, it will be noted that the inhibitor served to considerably inhibit corrosion as compared to the 2 to 3 hours observed with the oil not containing inhibitor.

Example VI

The corrosion inhibitor of this example was prepared by the condensation of tallow amine with beta-propiolactone in equimolar proportions. When evaluated in another sample of the oil and in the manner described in Example I, visible corrosion did not appear on the panel dipped in the oil containing 1% by weight of this inhibitor until after more than 14 days of exposure in the humidity cabinet. On the other hand, corrosion was visible on the panel dipped in a sample of the oil not containing inhibitor after 2–3 hours exposure in the humidity cabinet.

Example VII

A corrosion inhibitor prepared in the manner described in Example I was evaluated by a different method. In this test, metal test coupons are cleaned with HCl, washed, weighed and then dipped into an aqueous solution containing 5% sodium chloride (in one case containing no inhibitor and in the other case containing 0.01% by weight of the inhibitor described above), allowed to drain and then placed in a large desiccator, wherein the test coupons are exposed to an atmosphere of 100% humidity at 100° F. After about 48 hours the coupons are transferred to a desiccator and subjected to a humidity of about 30% at 100° F. After another 48 hours, the test coupons were dipped in the same solution, and the cycle repeated.

When evaluated in the above manner, and after exposure of 331 hours at 100% humidity and 336 hours at 30% humidity, the test coupon dipped in the solution not containing an inhibitor underwent an average weight loss of 1.9844 grams. On the other hand, the test coupon dipped in the solution containing the inhibitor underwent an average weight loss of 1.2712 grams. It will be noted that this inhibitor served to inhibit corrosion of the metal coupon.

Example VIII

As hereinbefore set forth, the beta-lactone may react with all or a portion of the amino nitrogen present in the amine or intermediate product. The present example illustrates the case in which the beta-lactone reacts with 100% of the amino nitrogen.

1550 grams of Duomeen T (8.6 mols of amino nitrogen) were heated to 55° C. and vigorously stirred. 142 grams of 91% para-formaldehyde (4.3 mols) were added to the stirred Duomeen T over a period of an hour. The reaction was exothermic and was cooled to maintain the temperature between 55° and 73° C. 500 cc. of hexane solvent was added and the mixture was refluxed at 73°–90° C. 102 cc. of water was collected. Subsequently the hexane solvent was removed by distillation under vacuum at a maximum temperature of 90° C. 1580 grams of product were recovered.

1563 grams of the product prepared in the above manner (8.5 mols of amino nitrogen) were vigorously stirred and heated to a temperature of 61° C. 605 grams of beta-propiolactone (8.5 mols) were added over a period of an hour and at a temperature controlled to maintain it between 63° and 72° C. Approximately the theoretical yield of reaction product was recovered and, upon cooling, was a viscous liquid which is readily soluble in heptane.

When evaluated in the humidity cabinet test in the manner heretofore described, the metal panel dipped in the sample of oil containing 1% by weight of the condensation product prepared in the manner described above did not undergo visible corrosion until after more than 14 days of exposure. This is in contrast to the 2 hours observed in the case of the panel dipped in oil not containing the inhibitor.

Example IX

The inhibitor prepared as described in Example VIII also is utilized as an inhibitor in grease in order to meet military specifications MIL–G–3278A for grease used in aircraft and instrument at both low and high temperatures. The grease will effectively lubricate at temperatures as low as −65° F. and as high as 250° F. and for short periods as high as 300° F. The corrosion properties are determined by rotating an assembled bearing for one minute at 1750 r.p.m., while holding the grease cup stationary. The entire assembly is dipped into freshly boiled distilled water which has been cooled to room temperature. The assembly is placed in a glass jar to which 5 ml. of distilled water had been added, and stored in this manner for 14 days at 77°±1° F. At the end of the test period, the bearings are removed, cleaned and rated for corrosion effects. When evaluated in the above manner, the grease containing 1% by weight of the inhibitor prepared as described in Example VIII satisfactorily meets the specifications hereinbefore set forth.

Example X

Examples VIII and IX describe inhibitors prepared by condensing equal molar proportions of beta-propiolactone and of amino nitrogen in the reaction product of equal molar proportions of Duomeen T and formaldehyde. This example describes 5 preparations using respectively 0.167, 0.333, 0.5, 0.667 and 0.833 molar proportions of beta-propiolactone per 1 molar proportion of amino nitrogen in the reaction product of Duomeen T and formaldehyde.

The Duomeen T-formaldehyde reaction product was prepared in substantially the same manner as described in Example VIII. The different condensation reactions with beta-propiolactone were effected in substantially the same manner as described in Example VIII except that the different molar proportions of beta-propiolactone were used. The products were recovered as viscous liquids.

When evaluated in the humidity cabinet test in the manner described in Example VIII, the inhibitors formed by the use of the different proportions of beta-lactone, each incorporated in the oil in a concentration of 1% by weight, all served to extend the time before visible corrosion to more than 175 hours and an average of over about 400 hours. This is in contrast to the 2 hours observed in the test run with oil not containing an inhibitor.

*Example XI*

As hereinbefore set forth, another embodiment of the invention includes the reaction of the amine with beta-lactone in a concentration to react with only a portion of the nitrogen and then neutralizing the product with an alkyl ester of phosphoric acid. This example illustrates a preparation in accordance with this embodiment of the invention. The inhibitor was prepared by reacting 3 molar proportions of beta - propiolactone with the Duomeen T-formaldehyde product prepared in substantially the same manner as described in Example VIII.

This product then was reacted with mixed mono- and diisooctyl acid orthophosphates by commingling 40 grams of the Duomeen T-formaldehyde-lactone reaction product with 26.7 grams of mixed mono-and diisooctyl acid orthophosphates, and heating the mixture with vigorous stirring to a temperature of 60° C. for 0.5 hour. The product was recovered as a viscous liquid.

The inhibitor prepared in the above manner was evaluated as an inhibitor to prevent corrosion of Admiralty metal in an atmosphere containing both ammonia and hydrogen sulfide. A polished metal strip is suspended in a closed flask containing a level of water through which hydrogen sulfide and ammonia are continuously passed. The flask is heated to a temperature of 90°–95° C. Continuously dropping over the suspended metal strip is heptane and condensate of hydrocarbon and water. In the test conducted with inhibitor, the inhibitor is added to the heptane in a concentration of 0.05% by weight.

When evaluated in the above manner, the weight loss in the test strip when using heptane not containing an inhibitor was 353.9 mg. On the other hand, in a duplicate set of runs in which the heptane contained 0.05% by weight of the inhibitor, the loss in weight was 88.9 mg. and 93.8 mg. Accordingly, it will be noted that the inhibitor served to considerably reduce the corrosion.

I claim as my invention:

1. A method of inhibiting corrosion of a metal surface upon contact with water, which comprises effecting said contact in the presence of a corrosion inhibiting concentration of the condensation product, formed at a temperature of from about ambient to about 100° C., of a beta-lactone containing from about 3 to about 6 carbon atoms per molecule and a polyamine containing from about 8 to about 70 carbon atoms per molecule, said lactone reacting with from aobut 10% to about 100% of the nitrogen in said amine.

2. A method as defined in claim 1 further characterized in that said lactone and said polyamine are reacted in equimolar proportions.

3. A method of inhibiting corrosion of a metal surface upon contact with water which comprises effecting the contact in the presence of a corrosion inhibiting concentration of the condensation product, formed at a temperature of from about 50° C. to about 100° C., of beta-propiolactone and N-tallow - 1,3 - diaminopropane, said lactone reacting with from about 10% to about 100% of the nitrogen of said amine.

4. A method as defined in claim 3 further characterized in that said lactone and said amine are reacted in equimolar proportions.

5. A method of inhibiting corrosion of a metal surface upon contact with water, which comprises effecting said contact in the presence of a corrosion inhibiting concentration of the condensation product, formed at a temperature of from about 50° C. to about 100° C., of beta-propiolactone with the condensation product of N-tallow-1,3-diaminopropane and formaldehyde, said lactone reacting with from about 10% to about 100% of the nitrogen in the last-mentioned condensation product.

6. A method of inhibiting corrosion of a metal surface upon contact with water, which comprises effecting said contact in the presence of a corrosion inhibiting concentration of the condensation product, formed at a temperature of from about 50° C. to about 100° C., of beta-propiolactone with the condensation product of N-tallow-1,3-diaminopropane and epichlorohydrin, said lactone reacting with from about 10% to about 100% of the nitrogen in the last-mentioned condensation product.

7. A method of inhibiting corrosion of a metal surface upon contact with water, which comprises effecting said contact in the presence of a corrosion inhibiting concentration of the condensation product, formed at a temperature of from about 50° C. to about 100° C., of beta-propiolactone with the condensation product of tallow amine and tetraethylene pentamine with epichlorohydrin, said lactone reacting with from about 10% to about 100% of the nitrogen in the last-mentioned condensation product.

8. A method of inhibiting corrosion of a metal surface upon contact with water, which comprises effecting said contact in the presence of a corrosion inhibiting concentration of the condensation product, formed at a temperature of from about 50° C. to about 100° C., of beta-propiolactone with the condensation product of N-tallow-1,3-diaminopropane and formaldehyde, said lactone reacting with less than all but at least about 10% of the nitrogen in the last-mentioned condensation product and at least a portion of the unreacted nitrogen being neutralized with an inorganic acid.

9. The method of claim 8 further characterized in that said inorganic acid is an alkyl ester of phosphoric acid.

10. The method of claim 9 further characterized in that said alkyl ester is a mixture of mono- and diisooctyl acid orthophosphates.

References Cited in the file of this patent

UNITED STATES PATENTS

| | | |
|---|---|---|
| 2,371,655 | Smith et al. | Mar. 20, 1945 |
| 2,502,453 | Gresham et al. | Apr. 4, 1950 |
| 2,548,156 | Gresham et al. | Apr. 10, 1951 |
| 2,712,531 | Maguire | July 5, 1955 |
| 2,758,086 | Stuart et al. | Aug. 7, 1956 |
| 2,851,345 | Marsh et al. | Sept. 9, 1958 |

OTHER REFERENCES

Mann et al.: "I. and E. Chem.," vol. 28, No. 2, February 1936, pages 159–163.